United States Patent
Sakamoto et al.

(10) Patent No.: US 12,143,924 B2
(45) Date of Patent: Nov. 12, 2024

(54) STATION PLACEMENT DESIGNING APPARATUS, STATION PLACEMENT DESIGNING METHOD AND PROGRAM

(71) Applicant: NIPPON TELEGRAPH AND TELEPHONE CORPORATION, Tokyo (JP)

(72) Inventors: Kazumitsu Sakamoto, Musashino (JP); Kenji Suzuki, Musashino (JP); Yohei Katayama, Musashino (JP); Yosuke Fujino, Musashino (JP); Hiroyuki Fukumoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 389 days.

(21) Appl. No.: 17/596,077

(22) PCT Filed: Jun. 6, 2019

(86) PCT No.: PCT/JP2019/022525
§ 371 (c)(1),
(2) Date: Dec. 2, 2021

(87) PCT Pub. No.: WO2020/245976
PCT Pub. Date: Dec. 10, 2020

(65) Prior Publication Data
US 2022/0322212 A1 Oct. 6, 2022

(51) Int. Cl.
*H04W 48/16* (2009.01)
*H04W 16/18* (2009.01)
*H04W 48/14* (2009.01)

(52) U.S. Cl.
CPC .......... *H04W 48/16* (2013.01); *H04W 16/18* (2013.01); *H04W 48/14* (2013.01)

(58) Field of Classification Search
CPC ..... H04W 48/16; H04W 16/18; H04W 48/14; H04W 24/08; H04W 24/02; Y02D 30/70
(Continued)

(56) References Cited

U.S. PATENT DOCUMENTS

2003/0068973 A1* 4/2003 Iwamura .............. H04W 88/08
455/3.01
2003/0182095 A1* 9/2003 Saito .................... H04W 16/18
716/135
(Continued)

FOREIGN PATENT DOCUMENTS

JP 2001285923 A 10/2001
JP 5077347 B2 11/2012
(Continued)

*Primary Examiner* — Mang Hang Yeung
(74) *Attorney, Agent, or Firm* — Harness, Dickey & Pierce, P.L.C.

(57) ABSTRACT

A communication quality calculation unit (11) of a base station placement design device (1) calculates communication quality of each terminal in a case where a base station is installed at a base station placement candidate location for a plurality of base station placement candidate locations. An aggregation unit (12) aggregate the number of terminals whose communication quality calculated by the communication quality calculation unit (11) is equal to or greater than a threshold value for each of the plurality of base station placement candidate locations. A base station placement location selection unit (13) selects a base station placement location from among the plurality of base station placement candidate locations, based on the number of terminals aggregated by the aggregation unit (12) for each of the plurality of base station placement candidate locations.

2 Claims, 8 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2010/0188997 A1 | 7/2010 | Aoyama et al. | |
| 2015/0156640 A1* | 6/2015 | Nguyen | H04W 16/18 |
| | | | 455/422.1 |
| 2018/0184303 A1* | 6/2018 | Egner | H04W 24/02 |

FOREIGN PATENT DOCUMENTS

| | | |
|---|---|---|
| JP | 5245389 B2 | 7/2013 |
| JP | 201472853 A | 4/2014 |

* cited by examiner

STATION PLACEMENT DESIGNING APPARATUS, STATION PLACEMENT DESIGNING METHOD AND PROGRAM

CROSS-REFERENCE TO RELATED APPLICATIONS

This application is a 371 U.S. National Phase of International Application No. PCT/JP2019/022525 filed on Jun. 6, 2019. The entire disclosure of the above application is incorporated herein by reference.

TECHNICAL FIELD

The present disclosure relates to a base station placement design device, a base station placement design method, and a program.

BACKGROUND ART

With the development of Internet of things (IoT) technology, it is becoming more popular every year to connect an object having various sensors and communication functions (hereinafter referred to as an "IoT device" or a "terminal") to a network to perform collecting of remote data and remote control of the IoT device, and the like. Furthermore, in recent years, low power wide area (LPWA) networks have been noted as a wireless communication scheme for IoT devices. LPWA includes, for example, wireless communication schemes such as LoRaWAN and Sigfox using an unlicensed band (a frequency band for which a wireless station license is not needed), and long term evolution for machines (LTE-M) and narrow band (NB)-IoT using a licensed band (a frequency band for which a wireless station license is needed).

IoT devices are often fixedly installed and used mainly at specific locations. On the other hand, radio propagation is highly dependent on a location. Thus, in a case where an IoT device is installed in a dead region in which received power of radio waves from a base station is low, this may result in a communication disabled state for a long period of time. For this reason, it is important to perform a base station placement design so that sufficient received power can be secured at a location where an IoT device is to be installed, or so that a communication success rate estimated based on information such as received power and surrounding interference occurrence conditions satisfies a target value.

In the base station placement design, typically, an optimal base station placement pattern for minimizing costs and the number of base stations is determined based on received power of radio waves transmitted from a base station (desired wave received power). Patent Literature 1 discloses a technique for covering an entire target region with a minimum number of base stations.

Examples of the related art for estimating a communication success rate include techniques disclosed in Patent Literature 2 and Patent Literature 3. The technique disclosed in Patent Literature 2 is a technique for measuring a communication success rate by temporarily installing a wireless device and actually attempting communication. Furthermore, the technique disclosed in Patent Literature 3 is a technique for estimating a throughput in a multi-cell environment constituted by a plurality of base stations using a Monte Carlo simulation. Patent Literature 4 discloses a technique making it possible to performing area design in consideration of an improvement and degradation in quality before and after the area design.

CITATION LIST

Patent Literature

Patent Literature 1: JP 2001-285923 A
Patent Literature 2: JP 2014-72853 A
Patent Literature 3: JP 5077347 B
Patent Literature 4: JP 5245389 B

SUMMARY OF THE INVENTION

Technical Problem

Cases where the base station placement design is performed are approximately classified into two types of cases. One of the cases is a case where an optimal base station placement pattern is determined in a case where the base station placement is newly performed to be able to cover an entire target region from a situation in which there is no base station. The other is a case where an optimal base station placement location is determined in a case where the base station placement is additionally performed to expand a wireless area in a situation in which some base stations have already been installed in a target region and a wireless area (cell) has been constructed.

The technique disclosed in Patent Literature 1 is an effective technique in the former case, but is not suitable for the base station placement for the latter wireless area expansion. This is because, although a location that was previously a dead region can be newly covered (quality improvement) by additionally performing the base station placement, there is a possibility that quality degradation will occur in a wireless area constructed by the existing base stations due to the generation of a new interference source (inter-cell interference) or a change in the influence of interference between the existing cells. In other words, in the base station placement design for wireless area expansion, considering only the perspective of a quality improvement effect of the elimination of a dead region based on desired wave received power is insufficient, and thus it is necessary to perform the base station placement design so that a communication success rate consequently satisfies a target value in consideration of quality degradation due to changes in inter-cell interference.

According to Patent Literature 4, it is possible to perform area design in consideration of an improvement and degradation in quality before and after area design such as the base station placement or wireless parameter adjustment. In Patent Literature 4, desired wave received power is used as radio wave quality to be considered in the area design. However, desired wave received power may be degraded only when wireless parameters are adjusted, and desired wave received power is not degraded due to the base station placement. Thus, Patent Literature 4 also describes a form including the case of the base station placement, but is not a technique that makes it possible to perform the base station placement design that substantially takes quality improvement/degradation before and after the base station placement into account.

In view of the above-described circumstances, an object of the present disclosure is to provide a base station placement design device, a base station placement design method, and a program which are capable of determining a base station placement location in a case where a wireless area is expanded.

Means for Solving the Problem

An aspect of the present disclosure is a base station placement design device including a communication quality calculation unit configured to calculate communication qualities of terminals in a case where a base station is installed at a base station placement candidate location among a plurality of base station placement candidate locations for each of the plurality of base station placement candidate locations, an aggregation unit configured to aggregate the number of terminals whose communication quality among the communication qualities calculated by the communication quality calculation unit is equal to or greater than a threshold value for each of the plurality of base station placement candidate locations, and a base station placement location selection unit configured to select a base station placement location from among the plurality of base station placement candidate locations, based on the number of terminals aggregated by the aggregation unit for each of the plurality of base station placement candidate locations.

An aspect of the present disclosure is a base station placement design method including calculating communication qualities of terminals in a case where a base station is installed at a base station placement candidate location among a plurality of base station placement candidate locations for each of the plurality of base station placement candidate locations, aggregating the number of terminals whose communication quality among the communication qualities calculated is equal to or greater than a threshold value for each of the plurality of base station placement candidate locations, and selecting a base station placement location from among the plurality of base station placement candidate locations, based on the number of terminals aggregated for each of the plurality of base station placement candidate locations.

An aspect of the present disclosure is a program causing a computer to operate as the above-described base station placement design device.

Effects of the Invention

According to the present disclosure, it is possible to determine a base station placement location in a case where a wireless area is expanded.

DESCRIPTION OF EMBODIMENTS

Hereinafter, embodiments of the present disclosure will be described in detail with reference to the drawings.

First Embodiment

Hereinafter, a first embodiment according to the present disclosure will be described. In the present embodiment, an optimal base station placement location is selected in consideration of the quality degradation of the existing area.

Figure 1:
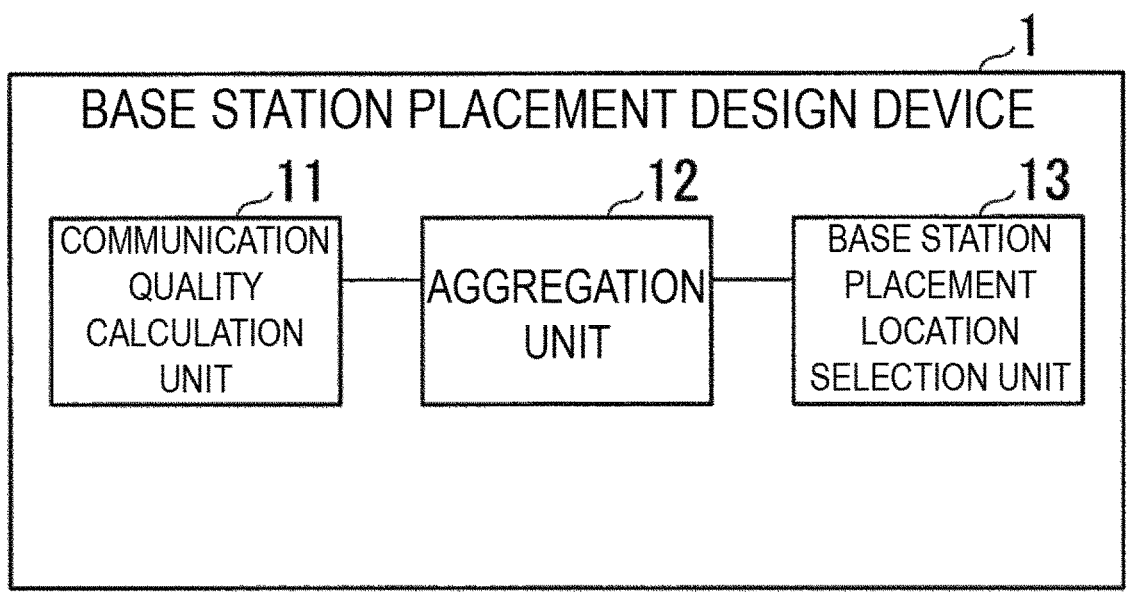
FIG. 1 is a block diagram illustrating a functional configuration of a base station placement design device according to a first embodiment.

Functional Configuration of Base Station Placement Design Device FIG. 1 is a block diagram illustrating a functional configuration of a base station placement design device 1 according to a first embodiment of the present disclosure. The base station placement design device 1 includes a communication quality calculation unit 11, an aggregation unit 12, and a base station placement location selection unit 13.

The communication quality calculation unit 11 calculates the communication quality of each terminal after a base station is placed at a base station placement candidate location for each of a plurality of base station placement candidate locations. Note that the terminal is fixedly installed, and an installation location is known. Furthermore, a base station may already be installed before a base station placement candidate location is selected, or may not be installed. An example of communication quality to be calculated is a communication success rate. A communication success rate of each terminal in a wireless communication system in which a terminal is fixedly installed can be estimated based on desired wave received power and interference signal power calculated from installation location information of a base station and a terminal and information such as traffic patterns, and thermal noise power of the base station and the terminal. The communication quality calculation unit 11 can use the frequency of uplink communication and an uplink communication time for each communication of a terminal, a communication occurrence time of acknowledge (Ack) from a base station to the terminal, and the like as the traffic patterns. The calculation of the communication success rate is described, for example, in JP 2019-042476. Specific examples of the calculation of the communication success rate will be described below using FIGS. 7 to 9.

The aggregation unit 12 aggregates the number of terminals having a communication success rate that is assumed after the base station placement at a base station placement candidate location, equal to or greater than a threshold value for each of the plurality of base station placement candidate locations. The base station placement location selection unit 13 compares the numbers of terminals aggregated for the base station placement candidate locations with each other, and selects a base station placement candidate location having the largest number of terminals as an optimal base station placement location.

Selection of Optimal Base Station Placement Location

Figure 2:
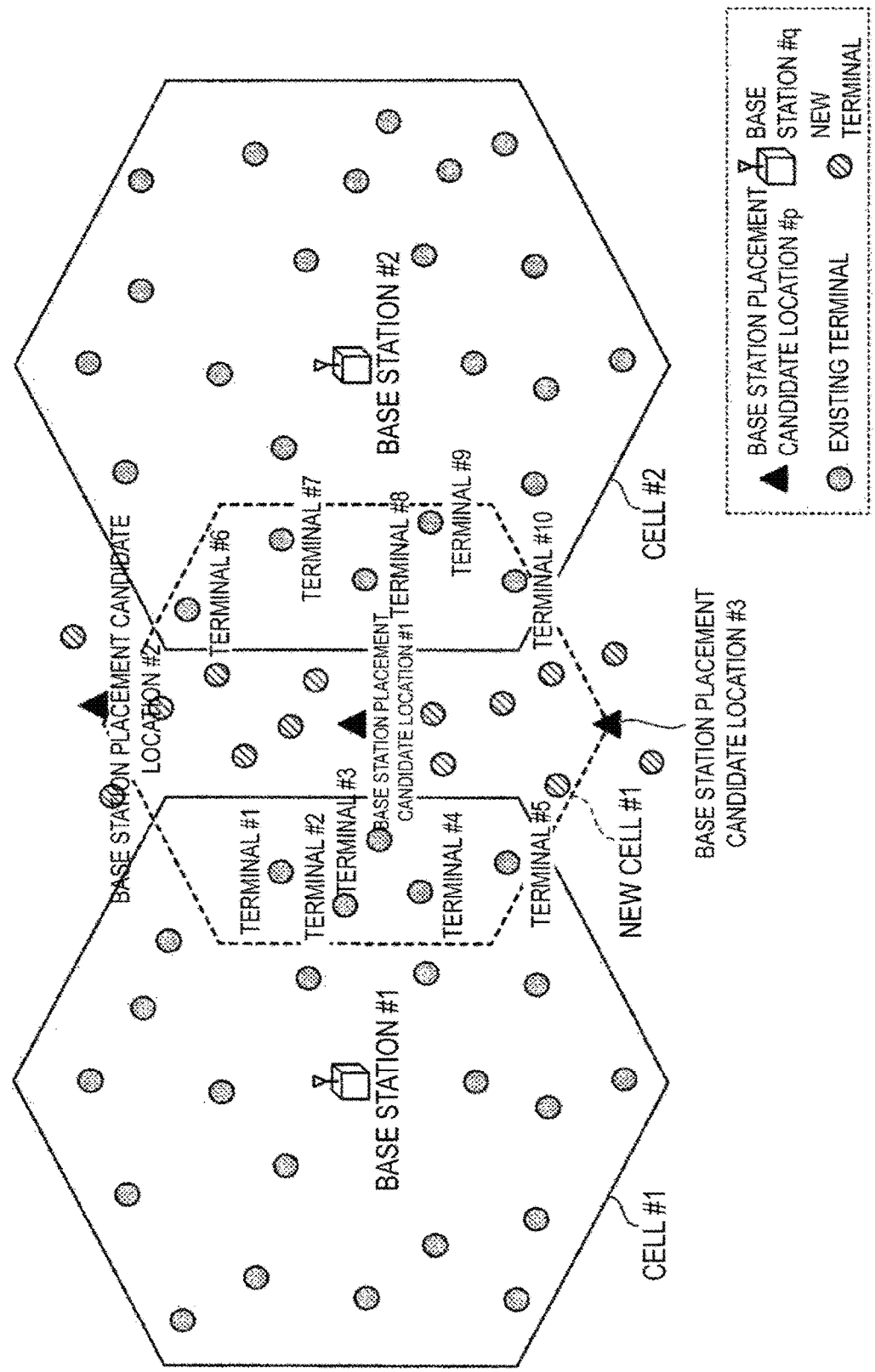
FIG. 2 is a diagram illustrating optimal base station placement location selection processing performed by the base station placement design device according to the first embodiment.
Figure 3:
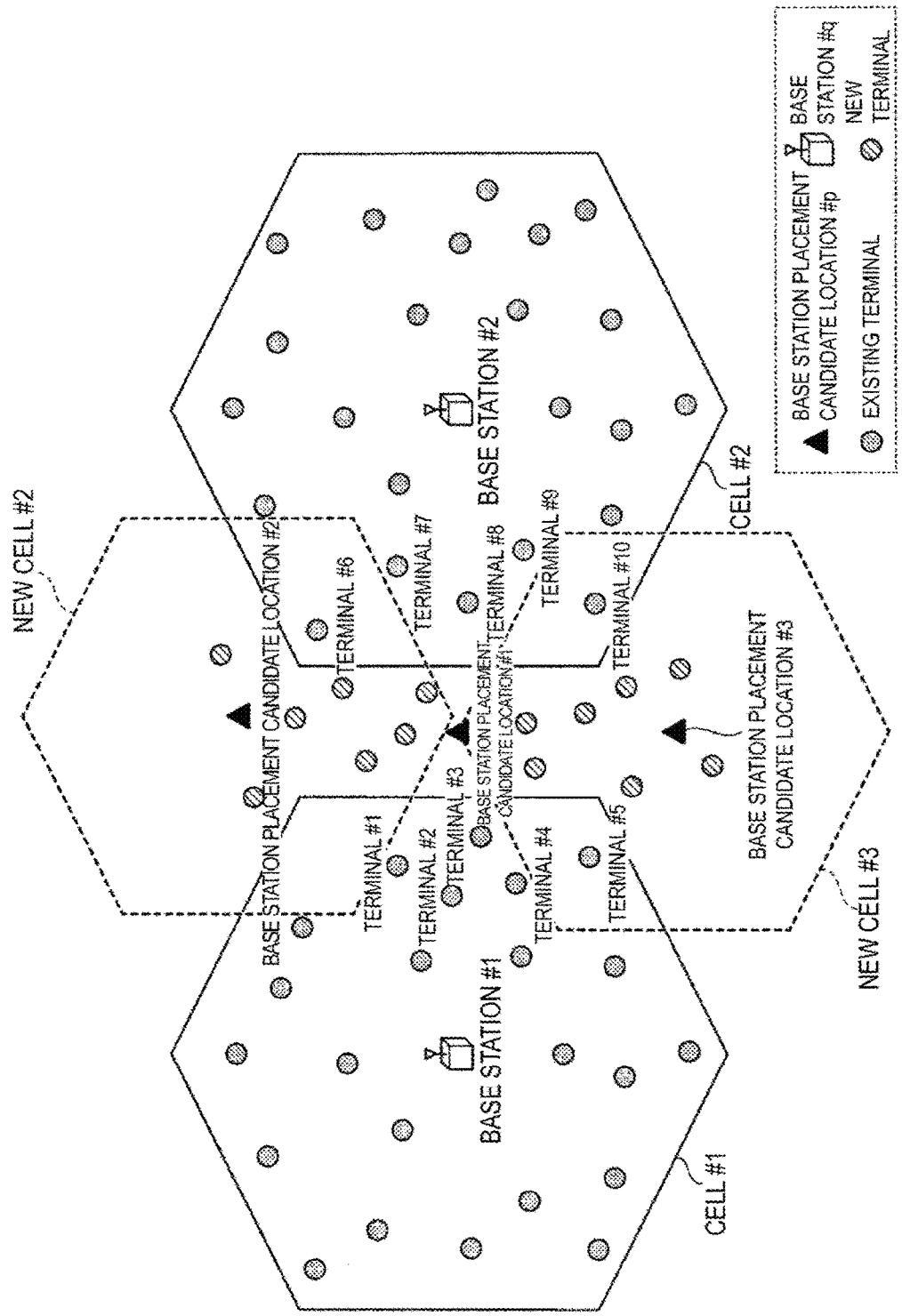
FIG. 3 is a diagram illustrating optimal base station placement location selection processing performed by the base station placement design device according to the first embodiment.

Hereinafter, processing of selecting an optimal base station placement location executed by the base station placement design device 1 will be described. FIGS. 2 and 3 are diagrams illustrating optimal base station placement location selection processing performed by the base station placement design device 1 according to the first embodiment of the present disclosure. As illustrated in FIGS. 2 and 3, the processing of selecting an optimal base station placement location will be described using an example of a case where a new terminal is accommodated by newly performing a base station placement on any one of the base station placement candidate locations in a situation in which a base station has already been installed and the existing terminal is in operation. Note that, hereinafter, a p-th base station (p is an integer equal to or greater than 1 and equal to or less than P) among P base stations that have already been installed (P is an integer equal to or greater than 1) is referred to as a base station #p, and a q-th base station placement candidate location (q is an integer equal to or greater than 1 and equal to or less than Q) among Q base station placement candidate locations (Q is an integer equal to or greater than 1) is referred to as a base station placement candidate location #q. FIGS. 2 and 3 show an example where P=2 and Q=3. In addition, 10 terminals among a plurality of existing terminals are referred to as terminals #1 to #10.

As illustrated in FIGS. 2 and 3, a cell #1 is constructed by a base station #1 already having been installed, and a cell #2 is constructed by a base station #2 already having been installed. In addition, it is assumed that the existing terminal in operation has a communication success rate equal to or greater than a threshold value and is in operation in a good quality state. The terminals #1 to #5 are included in the terminals in operation in the cell #1, and the terminals #6 to #10 are included in the terminals in operation in the cell #2. FIG. 2 illustrates a new cell #1 constructed in a case where the base station placement is performed at a base station placement candidate location #1. Furthermore, FIG. 3 illustrates a new cell #2 constructed in a case where the base station placement is performed at a base station placement candidate location #2, and a new cell #3 constructed in a case where the base station placement is performed at a base station placement candidate location #3.

As illustrated in FIG. 2, in a case where the base station placement is performed at the base station placement candidate location #1, radio waves of sufficient power reach 10 new terminals from a new base station placed at the base station placement candidate location #1. In other words, in a new cell constructed by a new base station, a communication success rate of the 10 new terminals is equal to or greater than a threshold value. In addition, radio waves transmitted from a new base station also reach the existing terminals #1 to #10. Thus, inter-cell interference from the new base station occurs in the existing terminals #1 to #10, and thus there is a possibility that a communication success rate of the existing terminals #1 to #10 will fall below a threshold value due to inter-cell interference. For example, when communication success rates of all of the existing terminals #1 to #10 fall below a threshold value due to inter-cell interference, communication success rates of 10 new terminals are set to be equal to or greater than a threshold value by placing a new base station, while the communication success rates of the 10 existing terminals fall below the threshold value. Consequently, the number of terminals the communication success rate of which is equal to or greater than the threshold value does not change before and after the base station placement.

On the other hand, as illustrated in FIG. 3, in a case where the base station placement is performed at the base station placement candidate location #2, there are seven new terminals having a communication success rate equal to or greater than a threshold value. However, the number of existing terminals having a communication success rate falling below the threshold value due to inter-cell interference is limited to one terminal #6. Thus, after the base station placement, the number of terminals having a communication success rate equal to or greater than the threshold value is increased by six terminals as compared to before the base station placement. Similarly, in a case where the base station placement is performed at the base station placement candidate location #3, the number of new terminals having a communication success rate equal to or greater than the threshold value is seven, and the number of existing terminals having a communication success rate falling below the threshold value due to inter-cell interference is two, that is, the terminal #5 and the terminal #10. Thus, after the base station placement, the number of terminals having a communication success rate equal to or greater than the threshold value is increased by five terminals as compared to before the base station placement.

As described above, in a case where the base station placement is performed at the base station placement candidate location #2 among the base station placement candidate locations #1 to #3, many new terminals can be accommodated while degradation of the quality of the terminals in the existing area is suppressed as much as possible, and thus it is possible to achieve effective wireless area expansion.

Note that, in this example, description has been given on the assumption that all of the existing terminals affected by inter-cell interference occurring due to new cells have a communication success rate falling below a threshold value. However, in practice, the degree of degradation of a communication success rate is determined according to the magnitude of desired wave received power transmitted from the existing base stations #1 and #2, the magnitude of inter-cell interference power, the probability of desired waves and interference waves colliding with each other, and the like. Thus, a communication success rate of the existing terminal affected by inter-cell interference does not necessarily fall below a threshold value. For this reason, the communication quality calculation unit 11 calculates a communication success rate of each terminal after the base station placement for each of the base station placement candidate locations. The aggregation unit 12 aggregates the number of terminals having a communication success rate equal to or greater than a threshold value after the base station placement, for each of the base station placement candidate locations.

The base station placement design device 1 may be implemented by a plurality of information processing devices connected to a network. In this case, which one of this plurality of information processing devices is used to implement each of the functional units of the base station placement design device 1 can be freely selected. For example, the communication quality calculation unit 11 and the aggregation unit 12 may be implemented by an information processing device different from an information processing device implementing the base station placement location selection unit 13. Alternatively, the communication quality calculation unit 11 may be implemented by an information processing device different from an information processing device implementing the aggregation unit 12 and the base station placement location selection unit 13. In addition, the same functional units may be implemented by a plurality of information processing devices.

Note that, although a case where a communication success rate is used as communication quality has been described above, the communication quality is an index related to desired waves and an interference signal. For example, a signal to interference plus noise power ratio (SINR) may be used as communication quality.

Figure 4:
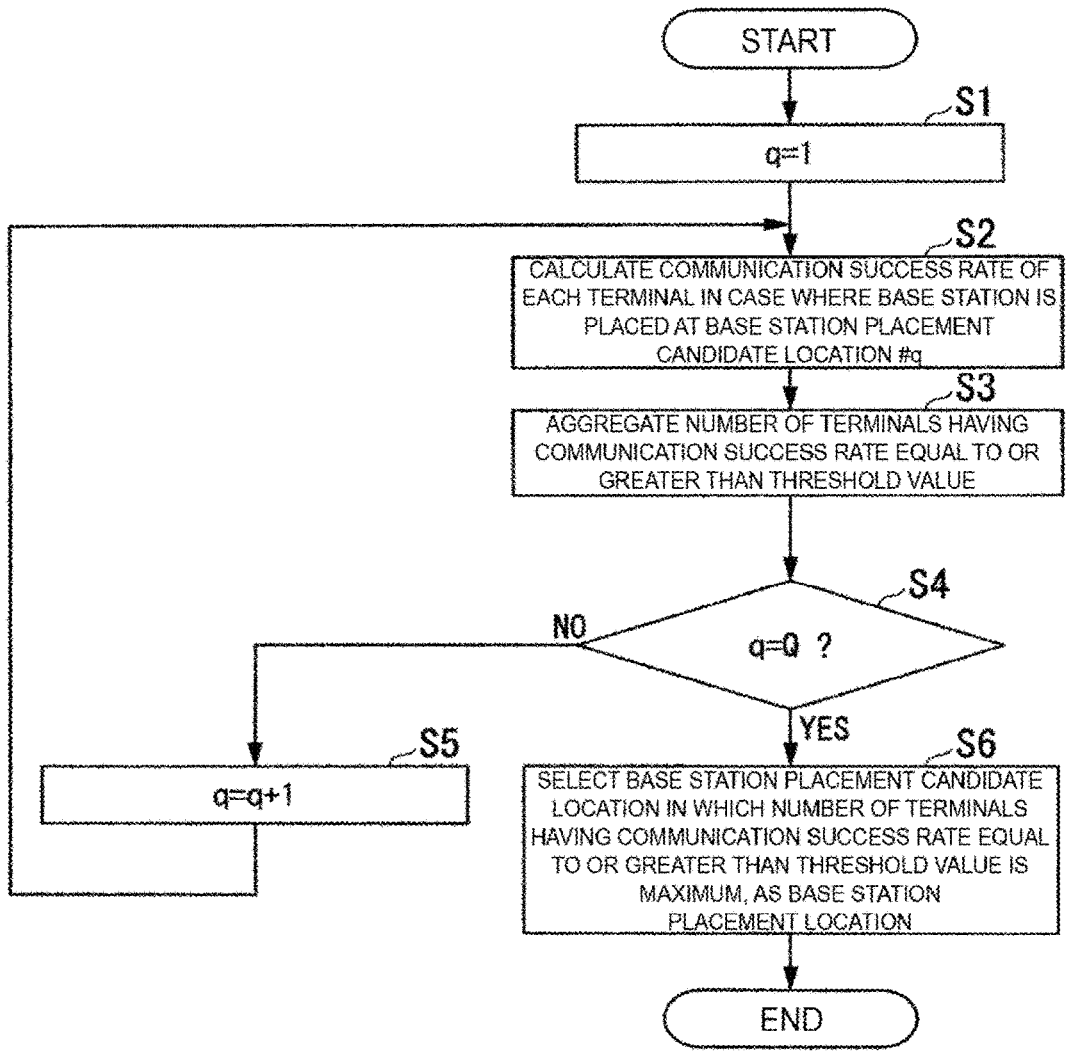
FIG. 4 is a flowchart illustrating operations of the base station placement design device according to the first embodiment.

Operations of Base Station Placement Design Device
Hereinafter, operations of the base station placement design device 1 will be described. FIG. 4 is a flowchart illustrating operations of the base station placement design device 1 according to a first embodiment. Here, the number of base station placement candidate locations is set to be Q (Q is an integer of 1 or greater).

The communication quality calculation unit 11 assigns a value of 1 to a variable q for identifying a base station placement candidate location (step S1). The communication quality calculation unit 11 calculates a communication success rate of each terminal in a case where the base station placement is performed at the base station placement candidate location #q (step S2). The aggregation unit 12 aggregates the number of terminals whose communication success rates calculated in step S2 are equal to or greater than a threshold value (step S3). The aggregation unit 12 determines whether the variable q is equal to the number of base station placement candidate locations Q (step S4). In a case where the aggregation unit 12 determines that the variable q is not equal to the number of base station placement candidate locations Q (step S4-NO), the aggregation unit 12 adds a value of 1 to the variable q (step S5) and then transitions to step S2. The base station placement design device 1 repeats the processing from step S2.

Then, in a case where the aggregation unit 12 determines that the variable q is equal to the number of base station placement candidate locations Q (step S4—YES), the aggregation unit 12 proceeds to step S6. The base station placement location selection unit 13 selects a base station placement candidate location in which the number of terminals having a communication success rate equal to or greater than a threshold value is maximum from among the base station placement candidate locations #1 to #Q as an optimal base station placement location (step S6). The base station placement location selection unit 13 outputs the selected base station placement location. The output may be performed on a display (not illustrated) included in the base station placement design device 1, may be writing on a recording medium, may be printing performed by a printing device, or may be output to a device connected to the base station placement design device 1.

According to the base station placement design device 1 of the present embodiment, it is possible to determine a base station placement location suitable for expanding a wireless area to accommodate a terminal in a new area while suppressing quality degradation of a terminal in the existing area in a base station placement design operation of a wireless communication system in which a terminal is fixedly installed. Note that, in a case where a base station is not installed before a base station placement candidate location is selected, the base station placement design device 1 performs the processing operations of steps S2 and S3 for each combination of available base station placement candidate locations (a case where an element constituting a combination is one base station placement candidate location may be included). Then, the base station placement design device 1 selects a combination of base station placement candidate locations in which the number of terminals having a communication success rate equal to or greater than a threshold value is maximum in step S6.

Second Embodiment

Hereinafter, a second embodiment according to the present disclosure will be described. In the present embodiment, an optimal base station placement location is selected in consideration of the quality degradation of an existing area and the priority of a terminal.

In the first embodiment described above, description has been given of a case where all terminals are handled equally, and a base station placement candidate location in which the number of terminals having a communication success rate equal to or greater than a threshold value is maximum is selected as an optimal base station placement location. On the other hand, in the second embodiment, a case where an optimal base station placement location is selected in consideration of the priority of a terminal will be described. Hereinafter, differences from the first embodiment will be mainly described.

Figure 5:
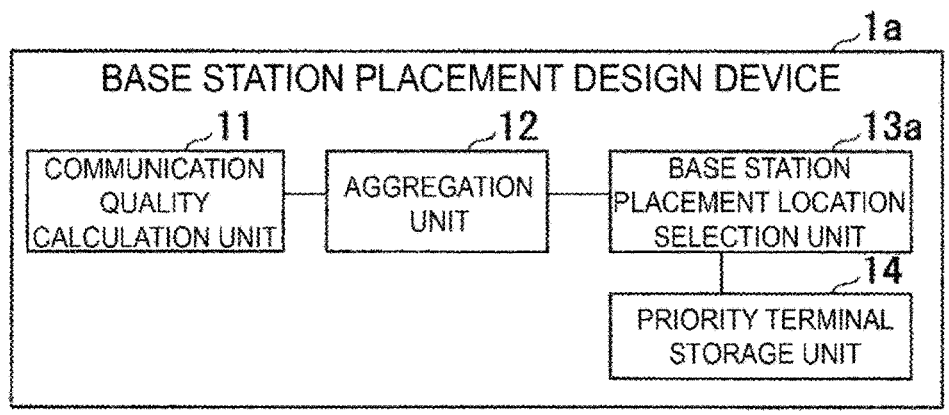
FIG. 5 is a block diagram illustrating a functional configuration of a base station placement design device according to a second embodiment.

Functional Configuration of Base Station Placement Design Device FIG. 5 is a block diagram illustrating a functional configuration of a base station placement design device 1a according to the second embodiment. In FIG. 5, the same portions as those of the base station placement design device 1 according to the first embodiment illustrated in FIG. 1 are denoted by the same reference numerals and signs, and description thereof will be omitted. The base station placement design device 1a includes a communication quality calculation unit 11, an aggregation unit 12, a base station placement location selection unit 13a, and a priority terminal storage unit 14. As described above, the base station placement design device according to the present embodiment has a different functional configuration from the base station placement design device 1 according to the first embodiment in that the base station placement location selection unit 13a is provided instead of the base station placement location selection unit 13, and the priority terminal storage unit 14 is provided.

The priority terminal storage unit 14 stores a terminal ID and an installation location of a terminal (hereinafter referred to as a "priority terminal") that preferentially secures communication quality. The priority terminal is a terminal for which communication quality is secured in preference to other terminals and which is required to be connected to a network at all times. For example, there is a case where a large number of sensors are installed for remote monitoring of railway line conditions or leakage detection of a water pipe network. In such a case, it is necessary to constantly collect and monitor data of sensors installed in an important line used by a large number of railways or installed in a trunk pipeline of a water pipe network. It is necessary to appropriately select a base station placement location from base station placement candidate locations so that required communication quality can also be secured after the base station placement for wireless area expansion for such a priority terminal.

The base station placement location selection unit 13a identifies a priority terminal with reference to the terminal IDs and the installation locations stored in the priority terminal storage unit 14, and extracts a base station placement candidate location in which communication success rates of priority terminals of a predetermined percentage or greater among all priority terminals are equal to or greater than a threshold value. In the present embodiment, a case where a predetermined percentage is 100% will be described as an example. In other words, the base station placement location selection unit 13a extracts a base station placement candidate location in which communication success rates of all of the priority terminals are equal to or greater than a threshold value. The base station placement location selection unit 13a selects a base station placement candidate location in which the number of terminals having a communication success rate equal to or greater than a threshold value is maximum from among the extracted base station placement candidate locations, as an optimal base station placement location.

The base station placement design device 1a may be implemented by a plurality of information processing devices connected to a network. In this case, which one of this plurality of information processing devices is used to implement functional units of the base station placement design device 1a can be freely selected. For example, the communication quality calculation unit 11, the aggregation unit 12, and the base station placement location selection unit 13a may be implemented by an information processing device different from an information processing device implementing the priority terminal storage unit 14. Further, the communication quality calculation unit 11 and the aggregation unit 12 may be implemented by an information processing device different from an information processing device implementing the base station placement location selection unit 13a, and the communication quality calculation unit 11 may be implemented by an information processing device different from an information processing device implementing the aggregation unit 12, and the base station placement location selection unit 13a. In addition, the same functional units may be implemented by a plurality of information processing devices.

Note that, although a case where a communication success rate is used as communication quality has been described above, the communication quality is an index related to desired waves and an interference signal, similar to the first embodiment. For example, an SINR may be used as communication quality.

Operations of Base Station Placement Design Device

Figure 6:
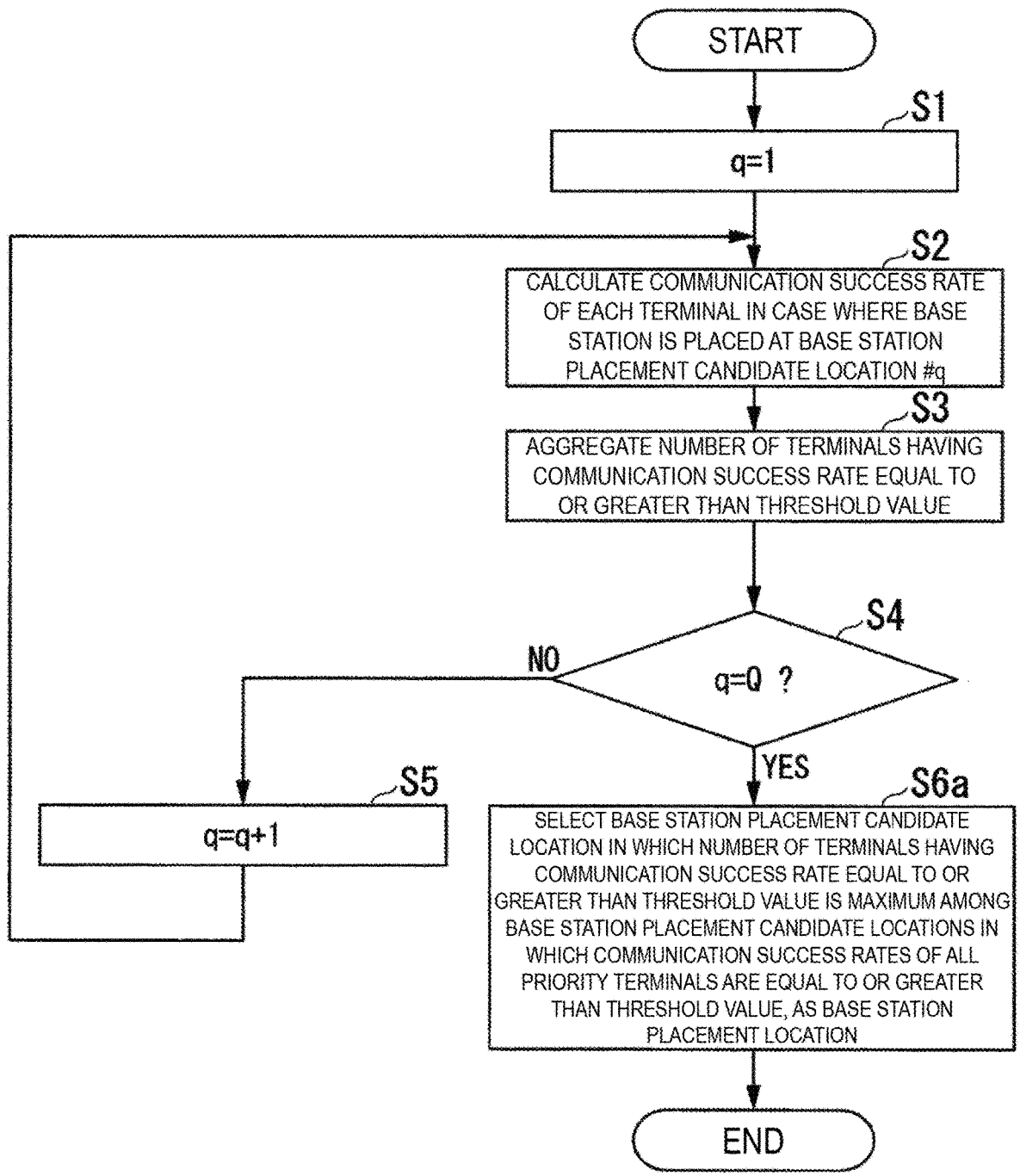
FIG. 6 is a flowchart illustrating operations of the base station placement design device according to the second embodiment.

Hereinafter, operations of the base station placement design device 1a will be described. FIG. 6 is a flowchart illustrating operations of the base station placement design device 1a according to the second embodiment. In FIG. 6, the same processing operations as the processing operations of the base station placement design device 1 according to the first embodiment illustrated in FIG. 4 are denoted by the same reference numerals and signs. In addition, the number of base station placement candidate locations is set to be Q (Q is an integer of 1 or greater).

The communication quality calculation unit 11 assigns a value of 1 to a variable q for identifying a base station placement candidate location (step S1). The communication quality calculation unit 11 calculates a communication success rate of each terminal in a case where the base station placement is performed at the base station placement candidate location #q (step S2). The aggregation unit 12 aggregates the number of terminals whose communication success rates calculated in step S2 are equal to or greater than a threshold value (step S3). The aggregation unit 12 determines whether the variable q is equal to the number of base station placement candidate locations Q (step S4). In a case where the aggregation unit 12 determines that the variable q is not equal to the number of base station placement candidate locations Q (step S4-NO), the aggregation unit 12 adds a value of 1 to the variable q (step S5) and then transitions to step S2. The base station placement design device 1 repeats the processing from step S2.

Then, in a case where the variable q is equal to the number of base station placement candidate locations Q (step S4—YES), the aggregation unit 12 proceeds to step S6a. The base station placement location selection unit 13a extracts a base station placement candidate location in which communication success rates of all priority terminals are equal to or greater than a threshold value with reference to terminal IDs and installation locations of priority terminals stored in the priority terminal storage unit 14. The base station placement location selection unit 13a selects a base station placement candidate location in which the number of terminals having a communication success rate equal to or greater than a threshold value is maximum from among the extracted base station placement candidate locations, as an optimal base station placement location (step S6a). The base station placement location selection unit 13a outputs the selected base station placement location.

As described above, the base station placement design device 1a according to the second embodiment performs the base station placement design capable of accommodating a large number of new terminals while securing communication quality of a priority terminal and suppressing quality degradation of a terminal in the existing area. Thus, it is possible to achieve effective wireless area expansion.

According to the above-described embodiment, it is possible to determine a base station placement location suitable for expanding a wireless area to accommodate a terminal in a new area while suppressing quality degradation of a terminal in the existing area in a base station placement design operation of a wireless communication system in which a terminal is fixedly installed.

Estimation of Communication Success Rate

An example of a communication success rate estimation device that can be used as the communication quality calculation unit 11 according to the first and second embodiments will be described. Note that, hereinafter, a case where a base station and a terminal use protocols of Class A and Class B of LoRaWAN will be described as an example. Uplink communication from the terminal to the base station is performed according to the protocol of Class A. Furthermore, downlink communication from the base station to the terminal is performed by the protocol of Class A in a case where acknowledge (Ack) for the uplink communication described above is transmitted, and the downlink communication is performed by the protocol of Class B in a case where data transferred from an application server to the base station is transmitted.

Further, in a case where there are a plurality of base stations on the periphery, a signal transmitted from the terminal is received at the plurality of base stations and demodulated. In addition, a successfully received signal is sent to a higher network server. Further, a signal having the highest received power is selected from among the signals successfully received at the network server (site diversity). Further, in a case where a base station includes a plurality of antennas, a signal transmitted from the terminal is received by the plurality of antennas and demodulated. In addition, a signal having the highest received power is selected from among the signals successfully received at the base station (antenna diversity).

Further, the downlink communication is performed using the base station and the antenna selected during just the previous uplink communication, and thus high communication quality is secured.

Note that, in the following description, a terminal for which a communication success rate is to be estimated is referred to as a "desired terminal", and the other terminals are referred to as "interference terminals". In addition, a base station for performing communication with a desired terminal is referred to as a "desired base station", and the other base stations are referred to as "interference base stations".

Figure 7:
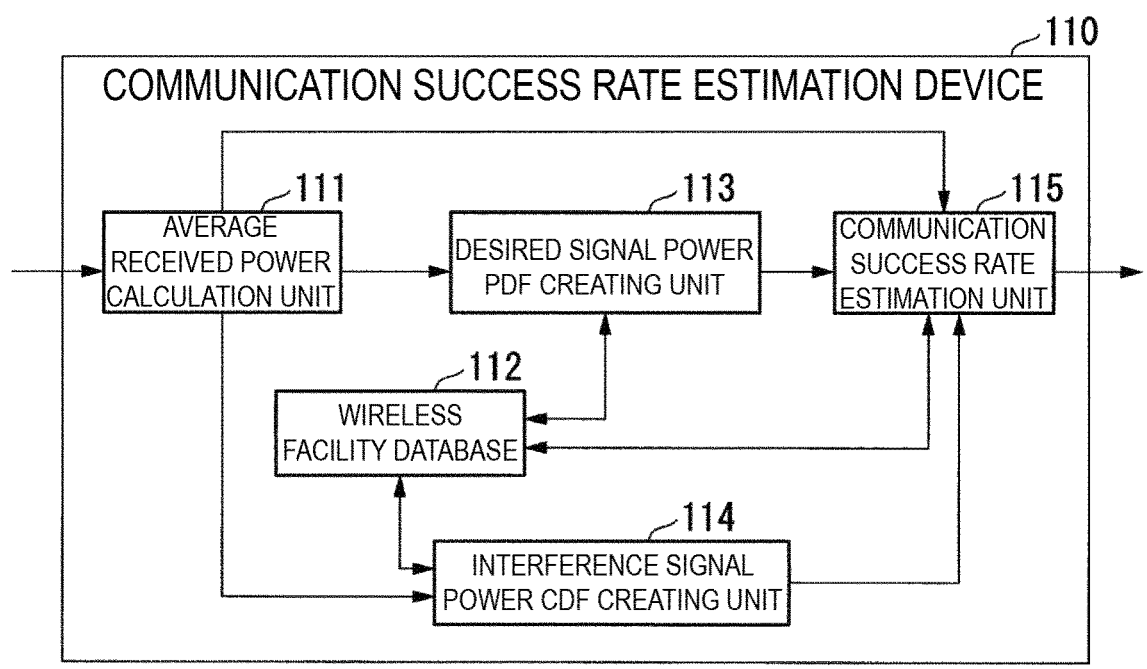
FIG. 7 is a block diagram illustrating a functional configuration of a communication success rate estimation device.

Functional Configuration of Communication Success Rate Estimation Device FIG. 7 is a block diagram illustrating a functional configuration of a communication success rate estimation device 110. As illustrated in FIG. 1, the communication success rate estimation device 110 includes an average received power calculation unit 111, a wireless facility database 112, a desired signal power PDF creating unit 113, an interference signal power CDF creating unit 114, and a communication success rate estimation unit 115. The communication success rate estimation device 110 is configured to estimate a base station and a terminal which are located in an area designated by an operator.

The average received power calculation unit 111 is equivalent to a typical radio propagation simulator. The average received power calculation unit 111 imports map data from an external device or the like. The map data is data indicating, for example, the heights of terrains, the heights of buildings, usage classification of lands, and the like. The average received power calculation unit 111 divides the map data of the area designated by the operator into small meshes (for example, meshes with intervals of 5 m). Then, the average received power calculation unit 111 calculates average received power of the uplink communication between the base station and each mesh (that is, a virtual terminal assumed to be installed at a position corresponding to each mesh). The average received power calculation unit 111 calculates an average interference signal power of inter-base station interference occurring between base stations based on the position of each base station.

The wireless facility database 112 holds parameters related to a wireless facility of each base station, such as the number of antennas and thermal noise power. In addition, the wireless facility database 112 holds parameters related to a wireless facility of each terminal, such as the number of antennas, thermal noise power, and traffic patterns (the frequency of communication and a communication time for each communication). Note that, as in LoRaWAN, in a case where there are a plurality of channels and a channel to be used is randomly selected for each communication, a value obtained by dividing the communication frequency of a terminal by the number of channels is set to be a communication frequency.

The desired signal power PDF creating unit 113 creates a probability density function (PDF) of a received power instantaneous value for each base station in consideration of the influence of an instantaneous fluctuation on average received power between a mesh in which a desired terminal is located and the base station. Hereinafter, a PDF of a received power instantaneous value of a desired signal is referred to as a "desired signal power PDF".

The interference signal power CDF creating unit 114 creates a probability density function of a received power instantaneous value in consideration of a traffic pattern and the influence of an instantaneous fluctuation on average received power between a mesh in which an interference terminal is located and a base station. In addition, the interference signal power CDF creating unit 114 creates a PDF of an interference signal power based on an average received power between a desired base station and an interference base station and a traffic pattern of an interference terminal under the interference base station. The interference signal power CDF creating unit 114 aggregates the created PDFs to create a cumulative distribution function (CDF). Hereinafter, a CDF created by aggregating PDFs of interference signals is referred to as an "interference signal power CDF".

The communication success rate estimation unit 115 calculates a probability that a signal to interference plus noise power ratio (SINR) is equal to or greater than a required SINR from a desired signal power PDF created by the desired signal power PDF creating unit 113, an interference signal power CDF created by the interference signal power CDF creating unit 114, and thermal noise power of a base station. The communication success rate estimation unit 115 calculates a communication success rate in consideration of effects of site diversity and antenna diversity based on the calculated probability. Here, the "required SINR" indicates the value of an SINR required for successful communication in wireless communication of a modulation scheme used.

Estimation of Communication Success Rate

Figure 8:
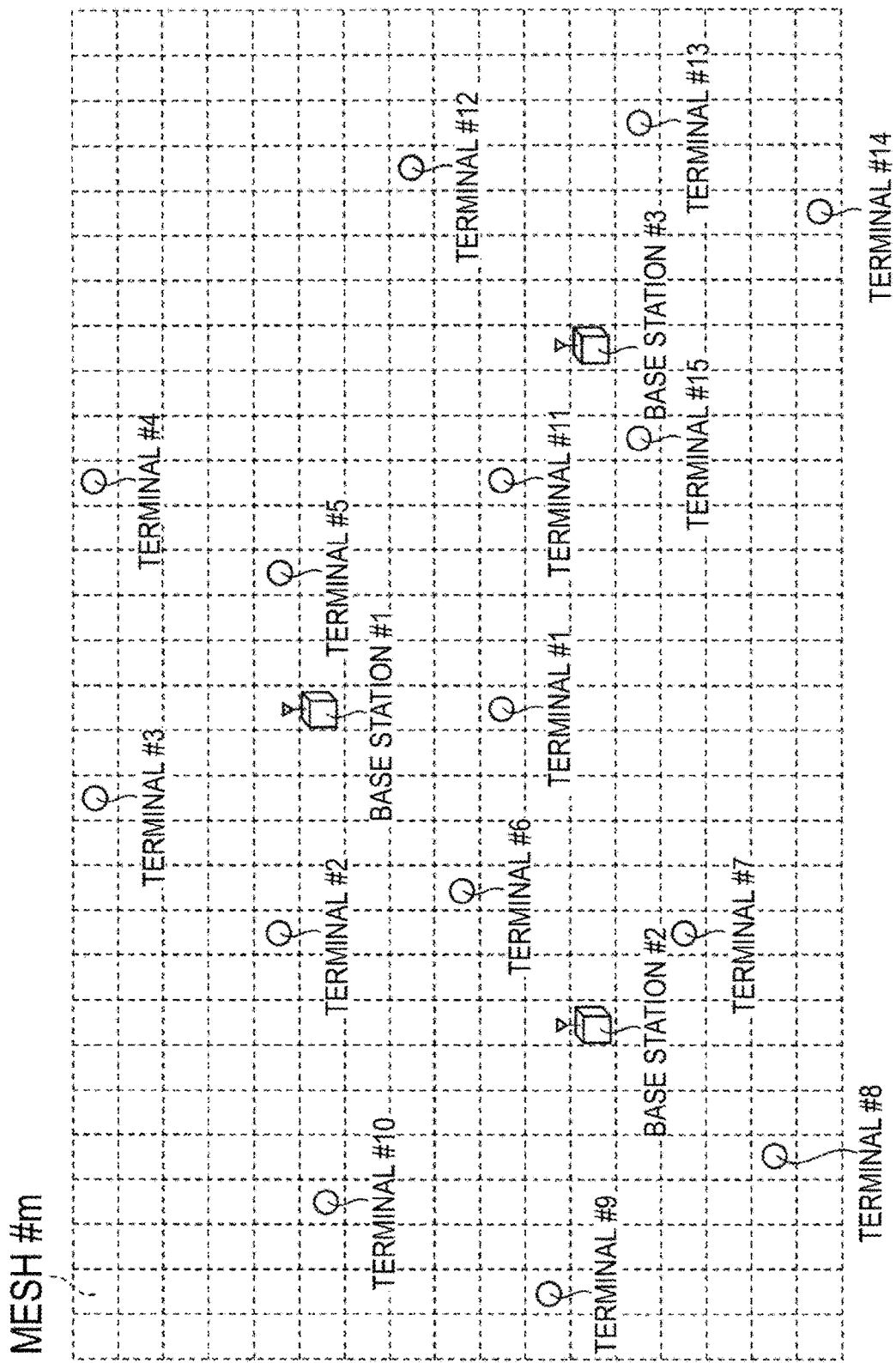
FIG. 8 is a diagram illustrating communication success rate estimation processing performed by the communication success rate estimation device.

A processing of estimating a communication success rate will be described. FIG. 8 is a diagram illustrating communication success rate estimation processing performed by the communication success rate estimation device 110. Note that, hereinafter, a case where a communication success rate in a channel used only in communication of Class A is estimated among a plurality of channels of LoRaWAN will be described. Note that, in a case where a communication success rate in channels used in communication of Class A and Class B is estimated, a communication occurrence time of the Class B is also taken into account when the interference signal power CDF creating unit 114 creates a PDF of interference signal power from an interference base station.

Hereinafter, as illustrated in FIG. 8, a case where a communication success rate of a terminal #1 and a terminal #n (n is an integer of 2 or greater) which are installed in an environment in which a wireless area is constructed in a plane by three base stations #1 to #3. Base stations #1 to #3 illustrated in FIG. 8 are equivalent to the existing base stations in the first and second embodiments and a base station that is placed at a base station placement candidate location. In addition, the terminals #1 and #n are equivalent to existing terminals or new terminals. Each of the base stations #1 to #3 includes a single antenna. Average received power of uplink communication from a terminal #j (j=1, 2, . . . ) in the base station #i (i=1, 2, 3) is represented by $R_{up}(i, j)$.

The average received power calculation unit 111 divides an area designated by an operator into small meshes. The average received power calculation unit 111 calculates average received power of uplink communication between a base station and each mesh (that is, a virtual terminal assumed to be installed at a location equivalent to each mesh). The average received power calculation unit 111 acquires the value of average received power in a mesh in which the terminal #j is located, and sets the value to be the average received power $R_{up}(i, j)$ of uplink communication between the base station #i and the terminal #j. In addition, the average received power calculation unit 111 calculates average interference signal power of inter-base station interference occurring between base stations, based on the positions of the base stations #1 to #3. Average interference signal power of inter-base station interference from the base station #i to the base station #k is represented by $R_{ICI}(i, k)$.

The interference signal power CDF creating unit 114 first creates a PDF of interference signal power from a terminal and a PDF of interference signal power between base stations.

The interference signal power CDF creating unit 114 creates a PDF of a received power instantaneous value for each terminal in consideration of a traffic pattern and the influence of an instantaneous fluctuation on average received power between a desired base station of a desired terminal and the terminal. The interference signal power CDF creating unit 114 performs convolution of a plurality of PDFs created to obtain a PDF of interference signal power from a terminal (a PDF of an interference signal from all terminals in a desired base station of a desired terminal).

Note that a simple method for calculating a received power instantaneous value is a Monte Carlo simulation method. In the Monte Carlo simulation method, a received power instantaneous value is calculated by randomly determining and combining phases of radio waves reaching the base station #i through a plurality of paths using a random number. Then, this operation is repeated to create a PDF of the received power instantaneous value. However, this repetitive calculation is typically performed numerous times (approximately tens of thousands of times). Thus, a long period of computation time is required.

Thus, an instantaneous fluctuation due to fading is expressed by the following analytical formula. Thus, it is possible to obtain a desired signal power PDF without performing a Monte Carlo simulation.

In a case where an amplitude of a received signal is set to be "a", a PDF of the amplitude "a" that instantaneously fluctuates due to the Rayleigh fading can be expressed by the following Expression (1) below using $R_{up}(i, j)$.

[Math. 1]

$$p(a) = \frac{a}{R_{up}(i, j)} \exp\left(-\frac{a^2}{2R_{up}(i, j)}\right) \quad (1)$$

A PDF of a received power instantaneous value is obtained by converting a result obtained in Expression (1) into a PDF of power $r=a^2$. The conversion can be represented by the following Expression (2).

[Math. 2]

$$p(r) = p(a)\frac{da}{dr} = \frac{1}{2R_{up}(i, j)} \exp\left(-\frac{r}{2R_{up}(i, j)}\right) \quad (2)$$

On the other hand, in order to create a PDF of interference signal power between base stations, it is necessary to determine which base station each terminal belongs to (that is, from which base station the downlink communication to a terminal is transmitted) and to aggregate the number of terminals belonging to each base station. Here, the number of terminals is aggregated on the assumption that each terminal belongs to the base station #i in which $R_{up}(i, j)$ is maximum. Then, a communication occurrence time of Ack (downlink communication based on Class A) to a terminal is calculated for each base station, based on a traffic pattern of uplink communication of a belonging terminal, and a PDF is created on the assumption that inter-base station interference of interference power $R_{ICI}(i, k)$ occurs during the calculated communication occurrence time in the entire time.

Note that base stations are typically installed at high positions such as on the roofs of high-rise buildings in many cases, and the base stations are typically in an environment where there are no reflectors or obstacles in the vicinity and there is a line of sight. Thus, for inter-base station interference, it is assumed that average interference signal power calculated based on a positional relationship between base stations is used. However, in a case where a reflection wave with low power arrives in addition to a direct wave arriving through a line-of-sight path between base stations, Rician fading is assumed, and a PDF of an interference signal power instantaneous value between base stations is created in consideration of the influence of an instantaneous fluctuation due to Rician fading on the average interference signal power calculated based on a positional relationship between the base stations.

In addition, the interference signal power CDF creating unit 114 performs convolution of a PDF of interference signal power from an interference base station #2 to a base station #1, a PDF of interference signal power from an interference base station #3 to the base station #1, and a PDF of interference signal power from a terminal to the base station #1 at the time of creating an interference signal power CDF in a case where the base station #1 is a desired base station. Thereby, the interference signal power CDF creating unit 114 creates a PDF (defined as $PDF_I(r)$) of total interference signal power and creates an interference signal power CDF ($CDF_{I\_1}(y)$) by the following Expression (3).

[Math. 3]

$$CDF_{I\_1}(y)=PDF(r \leq y)=\int_0^y PDF_1(r)dr \quad (3)$$

Similarly, the interference signal power CDF creating unit 114 performs convolution of a PDF of interference signal power from interference base station #1 to the base station #2, a PDF of interference signal power from the interference base station #3 to the base station #2, and a PDF of interference signal power from the terminal to the base station #2 at the time of creating an interference signal power CDF in a case where the base station #2 is a desired base station. Thereby, the interference signal power CDF creating unit 114 creates a PDF of total interference signal power and creates an interference signal power CDF ($CDF_{I\_2}(y)$).

Similarly, the interference signal power CDF creating unit 114 performs convolution of a PDF of interference signal power from the interference base station #1 to the base station #3, a PDF of interference signal power from the interference base station #2 to the base station #3, and a PDF of interference signal power from the terminal to the base station #3 at the time of creating an interference signal power CDF in a case where the base station #3 is a desired base station. Thereby, the interference signal power CDF creating unit 114 creates a PDF of total interference signal power and creates an interference signal power CDF ($CDF_{I\_3}(y)$).

The desired signal power PDF creating unit 113 creates desired signal power PDFs ($PDF_{S\_1}(y)$, $PDF_{S\_2}(y)$, and $PDF_{S\_3}(y)$) in consideration of the influence of an instantaneous fluctuation on average received power values $R_{up}(1, 1)$, $R_{up}(2,1)$, and $R_{up}(3,1)$ of desired signals from the terminal #1 to the base station #1, the base station #2, and the base station #3.

The communication success rate estimation unit 115 calculates a probability of an SINR being equal to or greater than a required SINR from a desired signal power PDF created by the desired signal power PDF creating unit 113, an interference signal power CDF created by the interference signal power CDF creating unit 114, and thermal noise power of a base station. Here, a probability at the base station #i is represented by $P_{up}(i)$. In addition, a communication success rate $P_{up}$ is calculated by the following Expression (4) in consideration of the effect of site diversity.

[Math. 4]

$$P'_{up}=1-(1-P_{up}(1))(1-P_{up}(2))(1-P_{up}(3)) \quad (4)$$

When the estimation of a communication success rate of the terminal #1 is completed as described above, the communication success rate estimation unit 115 continuously estimates communication success rates of other terminals #n according to the same procedure. Here, the processing, performed by the interference signal power CDF creating unit 114, up to the creating of an interference signal power CDF for each base station is common to all terminals (that is, the created interference signal power CDF is usable for all terminals in common). For this reason, the communication success rate estimation unit 115 can perform communication success rate estimation for the terminal #n using the same result. In other words, it is only required that the desired signal power PDF creating unit 113 creates a desired signal power PDF from the terminal #n to each base station, the communication success rate estimation unit 115 calculates $P_{up}(i)$, and the communication success rate estimation unit 115 calculates an uplink communication success rate $P'_{up}$ according to Expression (4) described above.

Figure 9:
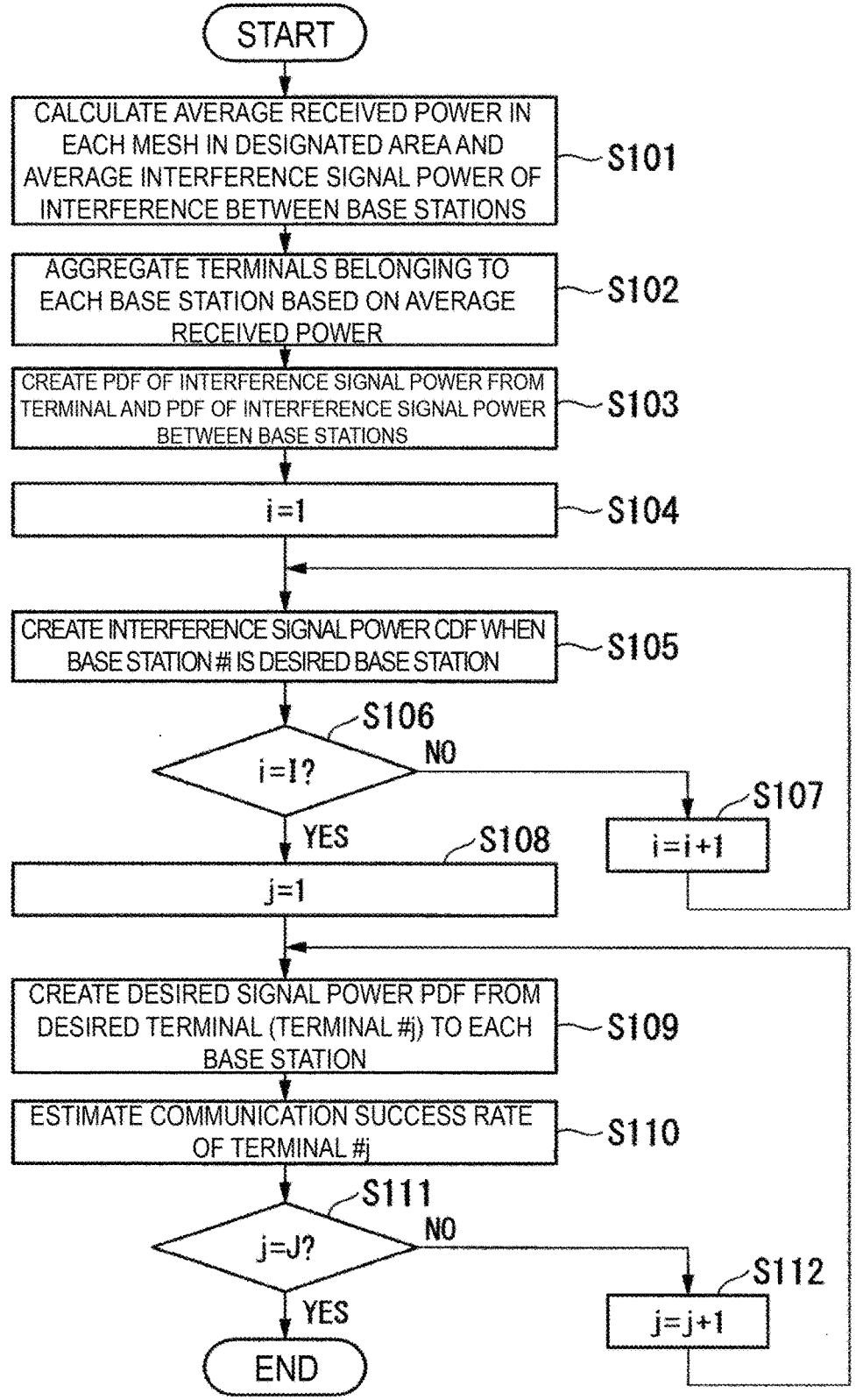
FIG. 9 is a flowchart illustrating operations of the communication success rate estimation device.

Operations of Communication Success Rate Estimation Device Hereinafter, operations of the communication success rate estimation device 110 in communication success rate estimation processing will be described. FIG. 9 is a flowchart illustrating operations of the communication success rate estimation device 110. Hereinafter, a desired terminal (a terminal for which a communication success rate is to be estimated) is set to be a terminal #j (j is an integer of 1 or greater), and the number of desired terminals is set to be J.

The average received power calculation unit 111 divides an area designated by an operator into small meshes. The average received power calculation unit 111 calculates average received power of uplink communication from each of the divided meshes to each base station. In addition, the average received power calculation unit 111 calculates average interference signal power of inter-base station interference based on the positions of the base stations (step S101).

The interference signal power CDF creating unit 114 aggregates the number of terminals belonging to each of the base stations on the assumption that each terminal belongs to a base station in which average received power is maximum (step S102).

Next, the interference signal power CDF creating unit 114 creates a PDF of interference signal power between base stations for each base station, based on a traffic pattern of uplink communication of the belonging terminals. The interference signal power CDF creating unit 114 creates a PDF of a received power instantaneous value in consideration of a traffic pattern and the influence of an instantaneous fluctuation on average received power between a base station and a terminal. Then, the interference signal power CDF creating unit 114 performs convolution of PDFs created to create a PDF of interference signal power from a terminal for each base station (step S103). The interference signal power CDF creating unit 114 assigns a value of 1 to a variable i for identifying a base station (step S104).

The interference signal power CDF creating unit 114 creates a PDF of total interference signal power by convolving a PDF of an inter-base station interference signal power from an interference base station to a desired base station and a PDF of interference signal power from a terminal to the desired base station when a base station #i is set to be the desired base station, and creates an interference signal power CDF (step S105).

The interference signal power CDF creating unit 114 determines whether the variable i is equal to the number of base stations I (step S106). In a case where the interference signal power CDF creating unit 114 determines that the variable i is not equal to the number of base stations I (step S106-NO), the interference signal power CDF creating unit 114 adds a value of 1 to the variable i (step S107) and proceeds to step S105. On the other hand, in a case where the interference signal power CDF creating unit 114 determines that the variable i is equal to the number of base stations I (step S106—YES), the processing transitions to step S108.

The desired signal power PDF creating unit 113 assigns a value of 1 to a variable j for identifying a desired terminal (step S108). The desired signal power PDF creating unit 113 creates a desired signal power PDF for each base station in consideration of the influence of an instantaneous fluctuation on average received power of a desired signal from the terminal #j to each base station (step S109).

The communication success rate estimation unit 115 calculates a probability of an SINR being equal to or greater than a required SINR for each base station, based on a desired signal power PDF, an interference signal power CDF, and thermal noise power of a base station. Then, the communication success rate estimation unit 115 calculates an uplink communication success rate according to Expression (4) described above, based on the calculated probability (step S110).

The communication success rate estimation unit 115 determines whether the variable j is equal to the number of desired terminals J (step S111). In a case where the communication success rate estimation unit 115 determines that the variable j is not equal to the number of desired terminals J (step S111-NO), the communication success rate estimation unit 115 adds a value of 1 to the variable j (step S112), and proceeds to step S105. On the other hand, in a case where the communication success rate estimation unit 115 determines that the variable j is equal to the number of desired terminals J (step S111—YES), the communication success rate estimation unit 115 terminates the processing of the flowchart illustrated in FIG. 9.

Note that, in the above description, description has been given on the assumption that there are a plurality of channels used in communication of Class A, and Ack transmission (downlink communication based on Class A) for uplink communication of Class A from a terminal is performed in any one channel of the plurality of channels. However, in a case where a channel for Ack transmission is prepared, and uplink communication and downlink communication of Class A do not interfere with each other, it is not necessary to create a PDF of interference signal power between base stations when creating an interference signal power CDF, and only a PDF of interference signal power from a terminal is used.

According to the above-described embodiments, the base station placement design device includes the communication quality calculation unit, the aggregation unit, and the base station placement location selection unit. The communication quality calculation unit calculates communication quality of each terminal in a case where a base station is installed at a base station placement candidate location for each of a plurality of base station placement candidate locations. For example, the communication quality calculation unit calculates communication quality of each terminal in a case where a base station is placed at a base station placement candidate location in addition to the installed base station. A terminal is installed, for example, at a fixed location. In addition, communication quality is a signal to interference plus noise power ratio or a communication success rate. The aggregation unit aggregates the number of terminals whose communication quality calculated by the communication quality calculation unit is equal to or greater than a threshold value, for each of the plurality of base station placement candidate locations. The base station placement location selection unit selects a base station placement location from among the plurality of base station placement candidate locations, based on the number of terminals aggregated by the aggregation unit for each of the plurality of base station placement candidate locations.

Alternatively, the base station placement location selection unit extracts base station placement candidate locations in which communication quality is equal to or greater than a threshold value in a predetermined ratio or more of terminals having high priority, among a plurality of terminals from a plurality of base station placement candidate locations, and selects a base station placement location based on the number of terminals having communication quality being equal to or greater than a threshold value from among the extracted base station placement candidate locations.

All or a part of the base station placement design devices 1 and 1a in the above-described embodiments may be implemented by a computer. In such a case, it may be implemented by recording a program for implementing the functions of the base station placement design devices 1 and 1a in a computer-readable recording medium, causing a computer system to read the program recorded in the recording medium, and executing the program. Note that the "computer system" as used herein includes an OS and hardware such as a peripheral device. In addition, the "computer-readable recording medium" refers to a portable medium such as a flexible disk, a magneto-optical disk, a read only memory (ROM), and a compact disk read only memory (CD-ROM), and a storage device such as a hard disk built into a computer system. Further, the "computer-readable recording medium" may also include such a computer-readable recording medium that stores programs dynamically for a short period of time, one example of which is a communication line used when a program is transmitted through a communication channel such as a network, for example, the Internet, and a telephone line, and may also include such a computer-readable recording medium that stores programs for a fixed period of time, one example of which is a volatile memory inside a computer system that functions as a server or a client in the above-described case. In addition, the above-mentioned program may be a program which is used for implementing a portion of the above-described functions, may be a program which is further capable of implementing the above-described functions in combination with programs previously recorded in the computer system, or may be a program which is implemented using hardware such as a programmable logic device (PLD) or a field programmable gate array (FPGA).

Although the embodiments of the present disclosure have been described above with reference to the drawings, it is apparent that the embodiments described above are merely examples of the present disclosure, and the present disclosure is not limited to the embodiments described above. Thus, addition, omission, substitution, and other modifications of the constituent elements may be made in the scope not departing from the technical idea and the gist of the present disclosure.

REFERENCE SIGNS LIST 1, 1a Base station placement design device
11 Communication quality calculation unit
12 Aggregation unit
13, 13a Base station placement location selection unit
14 Priority terminal storage unit
110 Communication success rate estimation device
111 Average received power calculation unit
112 Wireless facility database
113 Desired signal power PDF creating unit
114 Interference signal power CDF creating unit
115 Communication success rate estimation unit

The invention claimed is:

1. A base station placement design method comprising:
calculating communication qualities of terminals in a case where a base station is installed at a base station placement candidate location among a plurality of base station placement candidate locations for each of the plurality of base station placement candidate locations;
aggregating the number of terminals whose communication quality among the communication qualities calculated is equal to or greater than a threshold value for each of the plurality of base station placement candidate locations;
selecting a base station placement location from among the plurality of base station placement candidate locations, based on the number of terminals aggregated for each of the plurality of base station placement candidate locations; and
installing a base station at the selected base station placement location.

2. The base station placement design method according to claim 1, wherein the communication quality is a signal to interference plus noise power ratio or a communication success rate.

* * * * *